Figure 1:
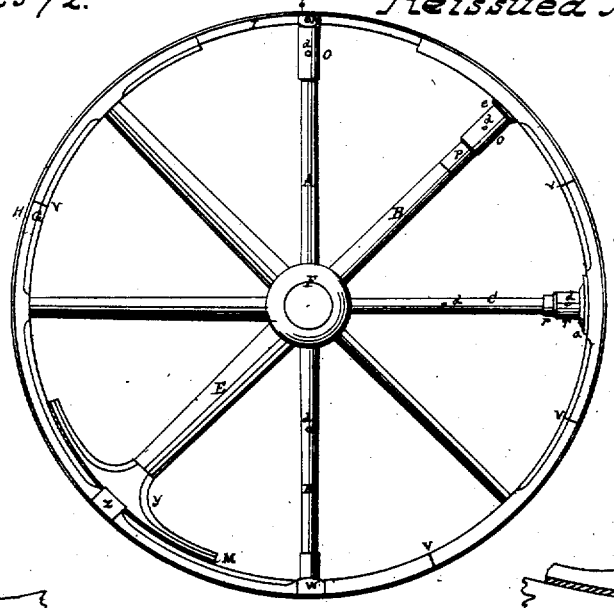

TITUTED FOR MISSING COPY.
BEST AVAILABLE COPY

J. Raddin.
Wheel.

No. 2572. Reissued Apr. 23. 1867.

Witnesses.
N. Ames
Samuel Green

Inventor.
John Raddin

SUBSTITUTED FOR MISSING COPY. Search Room

152. RESILIENT TIRES AND WHEELS.

BEST AVAILABLE COPY

42

United States Patent Office.

JOHN RADDIN, OF LYNN, AND GEORGE W. CHIPMAN, OF BOSTON, MASSACHUSETTS, ASSIGNEES OF JOHN RADDIN.

*Letters Patent No.* 48,207, *dated June* 13, 1865; *reissue No.* 2,572, *dated April* 23, 1867.

IMPROVEMENT IN CARRIAGE-WHEEL.

The Schedule referred to in these Letters Patent and making part of the same.

TO ALL WHOM IT MAY CONCERN:

Be it known that JOHN RADDIN, of Lynn, in the county of Essex, and State of Massachusetts, has invented a new and useful improvement in Carriage-Wheels, of which the following, taken in connection with the accompanying drawings, is a full, clear, and exact description, sufficient to enable those skilled in the art to practise the invention.

The invention relates to the construction of carriage-wheels with reference to rendering the same elastic for the purpose of relieving the carrirge body from the percussive effects consequent upon driving over stones, rough pavements, &c.

Previous to this invention various attempts have been made to accomplish this object, all of which have proved more or less objectionable or impracticable. In one of such constructions a sheet or strip of rubber is interposed between the felloes and the tire. But this proved unreliable, because the felloes became loosened, and because the rubber became more or less soft or decomposed, and was pressed out at the sides of the wheel, making the wheel unsightly. In another construction a false or sub-tire was first applied around the felloes, with a strip or band of rubber interposed between this and the tire proper. But although this sub-tire remedies the liability of the felloes to loosen, the rubber has the same tendency to become soft and to be pressed out laterally. Other constructions have, to a greater or less extent, these same defects, to which, however, it is not necessary herein to refer.

To so apply the rubber to the wheel as to obtain advantage of its elasticity without involving these objectionable features is the primary object of this invention. To effect this, the rubber, instead of being extended under the whole surface of the tire in the form of a band or strip, is applied directly to each spoke in the form of a block, cylinder, or cushion, each preferably enclosed in a metal box, in which, while provision is made for lateral expansion of the rubber by the pressure or strain exerted between the hub and tire, it is not exposed to sight, or to the heating action of the tire, or to contact of extraneous substances, and is so applied that all pressure exerted in the line of the spokes is received directly upon these rubber or elastic cushions. It is in this construction; arrangement, or method of applying the rubber cushions directly to, or in connection with, the spokes, when these are provided with means for radial extension or retraction, such, for example, as the screw-threads seen in the drawings, and by which adjustment of the spokes relative to the rubber may be had, that the invention consists, and also in some details of construction of parts of the elastic wheel, which will be hereinafter set forth.

The drawings represent a wheel and parts of a wheel embodying the invention—

Figure 1 showing a side elevation of a wheel, the several spokes of which represent modifications of the invention.

Figures 2, 3, 4, 5, and 6 are enlarged longitudinal central sections through the different spokes, showing their internal construction, and the manner in which they are connected with the other parts of a wheel.

Figure 3:
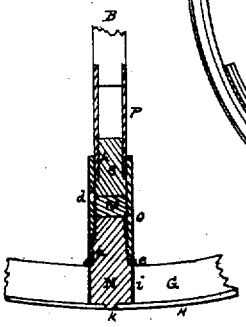
Figure 6:
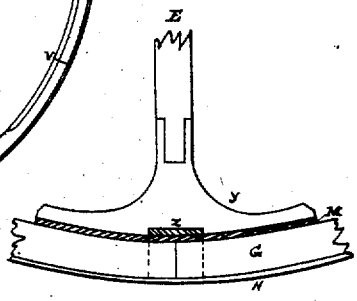
Figure 2:
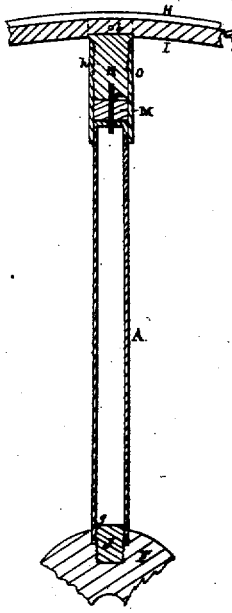
Figure 4:
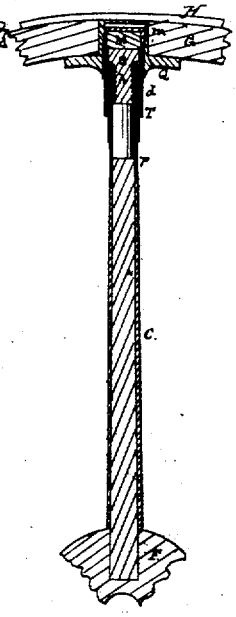
Figure 5:
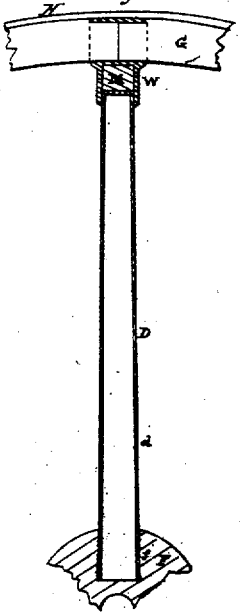

F denotes the hub of the wheel, which may be either of wood or metal; G a wooden felloe; and H the tire, all constructed like those in general use. I shows, in section, a metallic felloe, which, if desirable, may be used instead of wood. The spokes marked A, B, C, and D represent modifications of this invention as applied to a common carriage-wheel. In fig. 2 the spoke A is made of a hollow metallic cylinder, the hub end of which is provided with an internal screw, *g*, which receives the screw J, previously driven fast into the wooden hub F. The outer end of this cylinder is plugged or covered. N is a square-headed screw, the head of which is slotted so as to clasp the iron felloe I, to which it is confined by means of a pin or screw, *b*. O is a metallic cylinder or thimble, the bore of which is just large enough to receive the end of the spoke A and the screw N. One end of this thimble O is provided with an internal screw, *h*, which fits the external screw cut on N, as seen in fig. 2. *s* is a small pin, fast in the end of screw N, and passing freely through a hole in the centre of the end of the cylinder A, to form a guide for the spring or cushion M, made of rubber or other suitable elastic material, and enclosed within the thimble O between the ends of the screw N and cylinder A. This elastic cushion or packing is intended to relieve the jar and rattle of the wheel in passing over hard obstructions. In order to tighten the tire it is only necessary to turn the spoke A by any suitable instrument, and so as to move it outwardly in a radial direction, thus avoiding the necessity and expense of "resetting." In fig. 3 is represented a wooden spoke, provided with a metallic thimble, P, into the outer end of which is screwed the round-headed plug S N is a screw, fast in a hole through the felloe, the outer end of which screw is provided with a small square head, *k*, which passes through a corresponding hole in the tire, and keeps the screw from turning. *i* is a packing of gutta percha, which may be used, if desirable, around the said screw to hold it firmly in the hole in the felloe. *e* is a washer around the screw N, next to the felloe. O is a thimble, similar to O in fig. 2, and attached to the screw N in a similar manner. M is the elastic cushion, similar to that described in fig. 2. *d* is a hole in the side of the thimble O, by means of which, and a proper instrument inserted therein, it may be turned towards or from the felloe. By turning the screw-plug S the spoke B may be elongated, and the tightening of the tire accomplished, as in fig. 2. In fig. 4 is represented another modification of the invention, in which C is a common wooden spoke, having its felloe end provided with a fixed metallic thimble, P, in the outer end of which is cut an internal screw, *h*, to receive the screw *s*, which latter is furnished with a square head, so as to be readily turned by a suitable wrench against the elastic cushion M. Q is a flanged socket, the outer cylindrical portion of which passes through the felloe G, while the flanged portion rests against the inner edge of the same, as clearly shown in the drawing, fig. 4. In the cylindrical part of this socket Q are screw-threads *m* to receive the threads cut on the end of the thimble T, the latter being provided with a side hole, *d*, similar to the hole *d* in fig. 3, and for a similar purpose. Fig. 5 represents a hollow cylindrical or slightly conical metallic spoke D, provided with an external screw, *f*, which enters an internal screw in a metallic hub, F. The felloe end of this spoke D is closed, and enters the cylindrical part of the socket W, the outer portion of which is provided with a thimble so shaped as to receive the contiguous ends of two sections of the felloe G. M is the elastic cushion, similar to that applied to the ends of the other spokes already described, and for a similar purpose. *d* is a hole in the side of the spoke, by means of which, and a suitable instrument, the spoke may be screwed outward from the hub for the purpose of tightening the tire. In fig. 6 is represented a modification of the application of the elastic cushion, adapted more particularly for very heavy wagons, carriages, or cars, in which the outer end of the spoke E is provided with an expanded head, Y, of wood or metal, between which and the felloe a long strip of elastic packing, M, is placed, Z being a metallic clamp, the bottom of which is fast to the said head, and the sides of which extend each side of the felloe, (as shown in fig. 1,) whereby the latter is held in place. Other modifications will be obvious without further description, all containing the essence of the invention in having the rubber cushions combined directly with and so as to act in connection with the spokes.

It will be observed as a peculiar characteristic of my construction that the rim is so connected with the spokes and hub of the wheel as to be capable of radial movement in the line of each spoke, and that this movement is always against the yielding surface of the elastic cushion. Between the adjacent ends of adjacent felloes rubber cushions, *v*, may be interposed for the purpose of permitting the wheel or felloes to be slightly contracted or expanded in diameter without leaving spaces or open joints between the adjacent felloes.

What is claimed is—

A wheel, having combined directly with the spokes thereof elastic cushions or blocks of rubber so applied to or in the line of the spokes as to receive the strain exerted between the axle and the tire of the wheel, and having also means for relative adjustment of the spokes and cushions.

Also, the specific constructions described and shown in the several spokes represented in fig. 1 and in figs. 2, 3, 4, 5, and 6.

JOHN RADDIN,
GEO. W. CHIPMAN.

Witnesses:
FRANCIS GOULD,
W. B. GLEASON.